(12) United States Patent
Ho et al.

(10) Patent No.: US 10,399,226 B2
(45) Date of Patent: Sep. 3, 2019

(54) MULTIAXIAL ROBOT OF MULTITASKING

(71) Applicants:Inventec Appliances (Pudong) Corporation, Shanghai (CN); Inventec Appliances Corp., New Taipei (TW)

(72) Inventors: Dai-Shui Ho, New Taipei (TW); Chia-Hang Ho, Shanghai (CN)

(73) Assignees: Inventec Appliances (Pudong) Corporation, Shanghai (CN); Inventec Appliances Corp., New Taipei (TW)

( * ) Notice: Subject to any disclaimer, the term of this patent is extended or adjusted under 35 U.S.C. 154(b) by 258 days.

(21) Appl. No.: 15/336,806

(22) Filed: Oct. 28, 2016

(65) Prior Publication Data

US 2018/0009111 A1    Jan. 11, 2018

(30) Foreign Application Priority Data

Jul. 6, 2016   (CN) .......................... 2016 1 0525830

(51) Int. Cl.
| | |
|---|---|
| *B25J 9/16* | (2006.01) |
| *B25J 17/02* | (2006.01) |
| *B25J 15/00* | (2006.01) |
| *B25J 18/04* | (2006.01) |
| *B25J 9/04* | (2006.01) |
| *B25J 9/00* | (2006.01) |

(52) U.S. Cl.
CPC .............. *B25J 9/1687* (2013.01); *B25J 9/042* (2013.01); *B25J 15/0019* (2013.01); *B25J 15/0052* (2013.01); *B25J 17/02* (2013.01); *B25J 17/0258* (2013.01); *B25J 18/04* (2013.01); *B25J 9/009* (2013.01); *B25J 9/0087* (2013.01); *B25J 9/043* (2013.01); *B25J 9/044* (2013.01); *B25J 9/1682* (2013.01)

(58) Field of Classification Search
CPC ... B25J 9/042; B25J 9/043; B25J 9/044; B25J 9/0087; B25J 9/009; B25J 15/0052; B25J 15/0019; B25J 17/02; B25J 17/0258; B25J 18/04

See application file for complete search history.

(56) References Cited

U.S. PATENT DOCUMENTS

| | | | | |
|---|---|---|---|---|
| 4,762,455 | A | * | 8/1988 | Coughlan .................. B25J 3/04 376/248 |
| 4,828,453 | A | * | 5/1989 | Martin ....................... B25J 9/06 414/738 |

(Continued)

FOREIGN PATENT DOCUMENTS

| | | | | |
|---|---|---|---|---|
| DE | 3034912 | A1 * | 4/1981 | .............. B25J 9/046 |
| DE | 4211835 | A1 * | 10/1992 | ............ B25J 9/0084 |

(Continued)

*Primary Examiner* — Jermie E Cozart
(74) *Attorney, Agent, or Firm* — CKC & Partners Co., LLC (57) ABSTRACT

A multiaxial robot of multitasking includes a base, a plurality of arms, at least one wrist, a first engaging structure, and a second engaging structure. The arms are sequentially connected from the base, and any adjacent two of the base and the arms are configured to rotate relative to each other. The wrist is connected to the farthest arm arranged relative to the base and configured to rotate relative to the connected arm. The first engaging structure is disposed on the wrist and configured to connect a first tool. The second engaging structure is disposed on one of the arms and configured to connect a second tool.

15 Claims, 11 Drawing Sheets

(56) References Cited

U.S. PATENT DOCUMENTS

| | | | | |
|---|---|---|---|---|
| 5,100,284 | A * | 3/1992 | Boisseau | B25J 9/0084 |
| | | | | 414/744.3 |
| 5,201,630 | A * | 4/1993 | Ishida | B25J 9/042 |
| | | | | 318/568.18 |
| 9,120,222 | B2 * | 9/2015 | Grygorowicz | B25J 1/02 |
| 2003/0165378 | A1 * | 9/2003 | Lavitsky | B25J 5/007 |
| | | | | 414/744.5 |
| 2004/0001750 | A1 * | 1/2004 | Kremerman | B25J 9/042 |
| | | | | 414/744.1 |
| 2008/0041183 | A1 * | 2/2008 | Todorov | B25J 9/042 |
| | | | | 74/490.04 |
| 2008/0067966 | A1 * | 3/2008 | Ou | B25J 9/042 |
| | | | | 318/568.12 |
| 2011/0290090 | A1 * | 12/2011 | Urabe | B25J 9/1682 |
| | | | | 83/23 |
| 2013/0076902 | A1 * | 3/2013 | Gao | B25J 9/042 |
| | | | | 348/148 |
| 2014/0079524 | A1 * | 3/2014 | Shimono | B25J 9/1669 |
| | | | | 414/796.9 |
| 2015/0352720 | A1 * | 12/2015 | Iizuka | B25J 9/1682 |
| | | | | 700/245 |

FOREIGN PATENT DOCUMENTS

| | | | | | |
|---|---|---|---|---|---|
| EP | | 0136719 | A2 * | 4/1985 | B25J 9/06 |
| EP | | 0521440 | A2 * | 1/1993 | B25J 9/1682 |
| GB | | 2041879 | A * | 9/1980 | B25J 5/00 |
| JP | | 10124121 | A * | 5/1998 | B25J 9/1682 |
| WO | WO-2012104895 | A1 * | 8/2012 | | B25J 9/06 |

* cited by examiner

MULTIAXIAL ROBOT OF MULTITASKING

RELATED APPLICATIONS

This application claims priority to China Application Number 201610525830.5, filed Jul. 6, 2016, which is herein incorporated by reference.

BACKGROUND

Technical Field

The present disclosure relates to a multiaxial robot of multitasking.

Description of Related Art

Compared with industries (e.g., the automobile industry) using mechanical arms, products of 3C industries (Computer, Communication and Consumer Electronic) have short life cycles and high deprecation rates. For this reason, the demands of the 3C industries for robots are getting higher and higher. Currently, SCARA (Selective Compliance Assembly Robot Arm) is a robot widely used in the 3C industries, which is designed for planar tasks. Specifically, the SCARA uses two rotary joints to achieve rapid positioning in the X-Y plane, and additionally use a movement joint and a rotary joint to respectively move along and rotate about the Z-direction. The structural configuration makes the SCARA be good at grabbing an object from a location and then rapidly place the object at another location. Therefore, the SCARA has been widely used in automated assembly lines.

Although the SCARA has advantages of High-speed, having first and second rotary joints with strong rigidity of, low price, large effective operating range, having optimization for the X-Y plane, simple reverse movement, and etc, but also has disadvantages of only being able to work horizontally and having short stroke in Z-direction. Hence, current automated workstations using the SCARA in the 3C industries are still subject to many restrictions.

In addition, to perform three-dimensional actions, using a conventional six-axis mechanical arm can also be considered. The six-axis mechanical arm has advantages of having long arm length, moving with flexible angles, having optimization for 3D continuous path, and etc, so the six-axis mechanical arm can be used for almost all applications. However, the six-axis mechanical arm has disadvantages of slow, high price, having restrictions to spherical working range, difficult reverse movement, having singularities, and etc.

Moreover, when the above-mentioned robots execute many tasks with different end tools, the end tools are fastened at the same flange and switched by rotating. However, the integrated end tools are heavy and huge in volume, which slow the switching of the tools due to the increase of angular inertia and severely affect the speed and flexibility in the operation of the robots.

Accordingly, how to provide a multiaxial robot to solve the aforementioned problems becomes an important issue to be solved by those in the industry.

SUMMARY

An aspect of the disclosure is to provide a multiaxial robot of multitasking including two end tools respectively having different loading capacities, different arm lengths, different precisions, and different degrees of freedom, so as to flexibly allocate tasks.

According to an embodiment of the disclosure, the multiaxial robot of multitasking includes a base, a plurality of arms, at least one wrist, a first engaging structure, and a second engaging structure. The arms are sequentially connected from the base. Any adjacent two of the base and the arms are configured to rotate relative to each other. The wrist is connected to the farthest arm arranged relative to the base and configured to rotate relative to the connected arm. The first engaging structure is disposed on the wrist and configured to connect a first tool. The second engaging structure is disposed on one of the arms and configured to connect a second tool.

In an embodiment of the disclosure, the second engaging structure is disposed on the farthest arm arranged relative to the base.

In an embodiment of the disclosure, the arms are configured to rotate parallel to a first plane relative to the base. The wrist is configured to rotate parallel to a second plane relative to the connected arm.

In an embodiment of the disclosure, the multiaxial robot of multitasking further includes an elevator member. The elevator member is pivotally connected to the base and connected to an adjacent one of the arms. The elevator member is configured to elevate components of the multiaxial robot of multitasking arranged after the elevator member relative to the base in an elevating direction.

In an embodiment of the disclosure, the arms include a first arm, a second arm, and a third arm. An end of the first arm is slidably connected to the elevator member. An end of the second arm is pivotally connected to another end of the first arm. An end of the third arm is pivotally connected to another end of the second arm. The wrist is pivotally connected to another end of the third arm.

In an embodiment of the disclosure, the second engaging structure is disposed on the third arm and adjacent to the end of the third arm pivotally connected to the second arm.

In an embodiment of the disclosure, the multiaxial robot of multitasking further includes an elevator member. The elevator member is connected to adjacent two of the arms and the wrist. The elevator member is configured to elevate components of the multiaxial robot of multitasking arranged after the elevator member relative to the base in an elevating direction.

In an embodiment of the disclosure, the arms include a first arm, a second arm, and a third arm. An end of the first arm is pivotally connected to the base. Another end of the first arm is slidably connected to the elevator member. An end of the second arm is pivotally connected to the elevator member. An end of the third arm is pivotally connected to another end of the second arm. The wrist is pivotally connected to another end of the third arm.

In an embodiment of the disclosure, the arms include a first arm, a second arm, and a third arm. An end of the first arm is pivotally connected to the base. Another end of the first arm is slidably and pivotally connected to the elevator member. An end of the second arm is pivotally connected to the elevator member. An end of the third arm is pivotally connected to another end of the second arm. The wrist is pivotally connected to another end of the third arm.

In an embodiment of the disclosure, the arms include a first arm, a second arm, and a third arm. An end of the first arm is pivotally connected to the base. An end of the second arm is pivotally connected to another end of the first arm. Another end of the second arm is slidably connected to the elevator member. An end of the third arm is pivotally connected to the elevator member. The wrist is pivotally connected to another end of the third arm.

In an embodiment of the disclosure, the arms include a first arm, a second arm, and a third arm. An end of the first arm is pivotally connected to the base. An end of the second arm is pivotally connected to another end of the first arm. Another end of the second arm is slidably and pivotally connected to the elevator member. An end of the third arm is connected to the elevator member. The wrist is pivotally connected to another end of the third arm.

In an embodiment of the disclosure, the arms include a first arm, a second arm, and a third arm. An end of the first arm is pivotally connected to the base. An end of the second arm is pivotally connected to another end of the first arm. An end of the third arm is pivotally connected to another end of the second arm. Another end of the third arm is slidably connected to the elevator member. The wrist is pivotally connected to the elevator member.

In an embodiment of the disclosure, the second engaging structure is disposed on the farthest arm arranged relative to the base.

In an embodiment of the disclosure, the multiaxial robot of multitasking further includes a first wrist and a second wrist. The first wrist is connected to the farthest arm arranged from the base and configured to rotate parallel to the second plane relative to the connected arm. The second wrist is pivotally connected to the first wrist and configured to rotate parallel to a third plane relative to the first wrist.

In an embodiment of the disclosure, the first engaging structure is disposed on the second wrist and located at an end of the second wrist distal to the first wrist.

According to an embodiment of the disclosure, an operating method for operating a multiaxial robot to assemble a first workpiece located at a first position and a second workpiece located at a second position. The multiaxial robot of multitasking includes a base, a plurality of arms, at least one wrist, a first engaging structure, a first grabber, a second engaging structure, and a second grabber. The arms are sequentially connected away from the base. The wrist is connected to the farthest arm arranged relative to the base. The first engaging structure is disposed on the wrist. The first grabber is connected to the first engaging structure. The second engaging structure is disposed on one of the arms. The second grabber is connected to the second engaging structure. The operating method includes: (a) moving the wrist relative to the connected arm or further moving at least one of the arms relative to the base, so as to move the first grabber to the first position; (b) picking up the first workpiece by the first grabber; (c) moving at least one of the arms relative to the base or further moving the wrist relative to the connected arm, so as to move the second grabber to the second position; (d) picking up the second workpiece by the second grabber; (e) moving at least one of the arms relative to the base, so as to move the second grabber to a third position; (f) placing the second workpiece at the third position by the second grabber; (g) moving at least one of the arms relative to the base and moving the wrist relative to the connected arm, so as to move the first grabber to the third position; and (h) assembling the first workpiece to the second workpiece by the first grabber.

In an embodiment of the disclosure, the operating method further includes: (i) moving at least one of the arms relative to the base and moving the wrist relative to the connected arm, so as to move the second grabber to the third position; (j) picking up the assembled first and second workpieces by the second grabber; (k) moving at least one of the arms relative to the base, so as to make the second grabber move the assembled first and second workpieces to a fourth position; and (l) placing the assembled first and second workpieces at the fourth position by the second grabber.

Accordingly, the multiaxial robot of multitasking of the disclosure installs two engaging structures at different components (e.g., one engaging structure is installed at an arm, and another engaging structure is installed at a wrist), so the multiaxial robot of multitasking can include two end tools respectively having different loading capacities, different arm lengths, different precisions, and different degrees of freedom, so as to flexibly allocate tasks. With the structural configuration of including two independent engaging structures, the multiaxial robot of multitasking of the disclosure can effectively reduce the weight at the extremity of robotic arm and increase the speed due to the decrease of angular inertia. Furthermore, because the volume at the extremity of the robotic arm is also reduced, movements of the multiaxial robot of multitasking of the disclosure can be more flexible.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
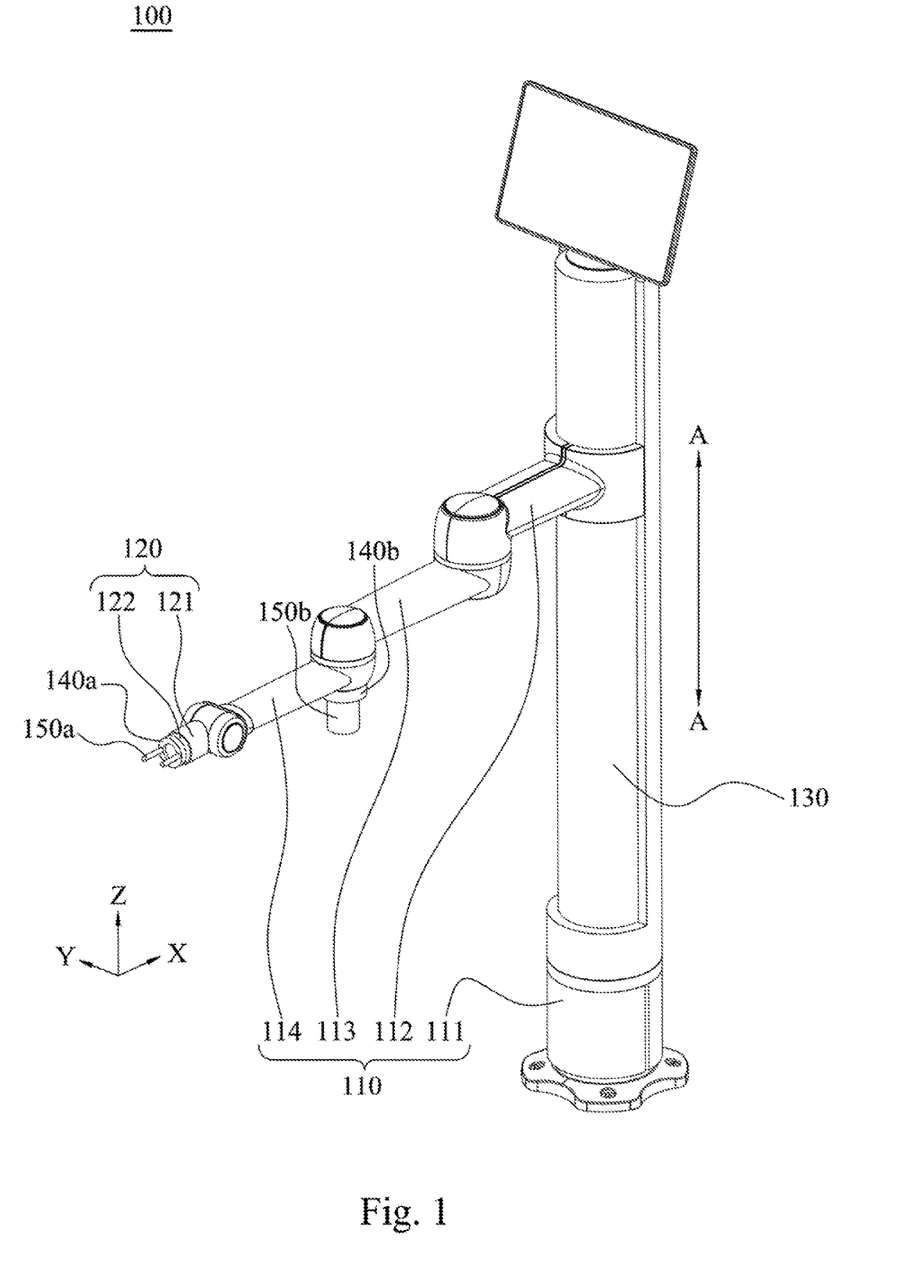
FIG. 1 is a perspective view of a multiaxial robot of multitasking according to an embodiment of the disclosure.
Figure 3A:
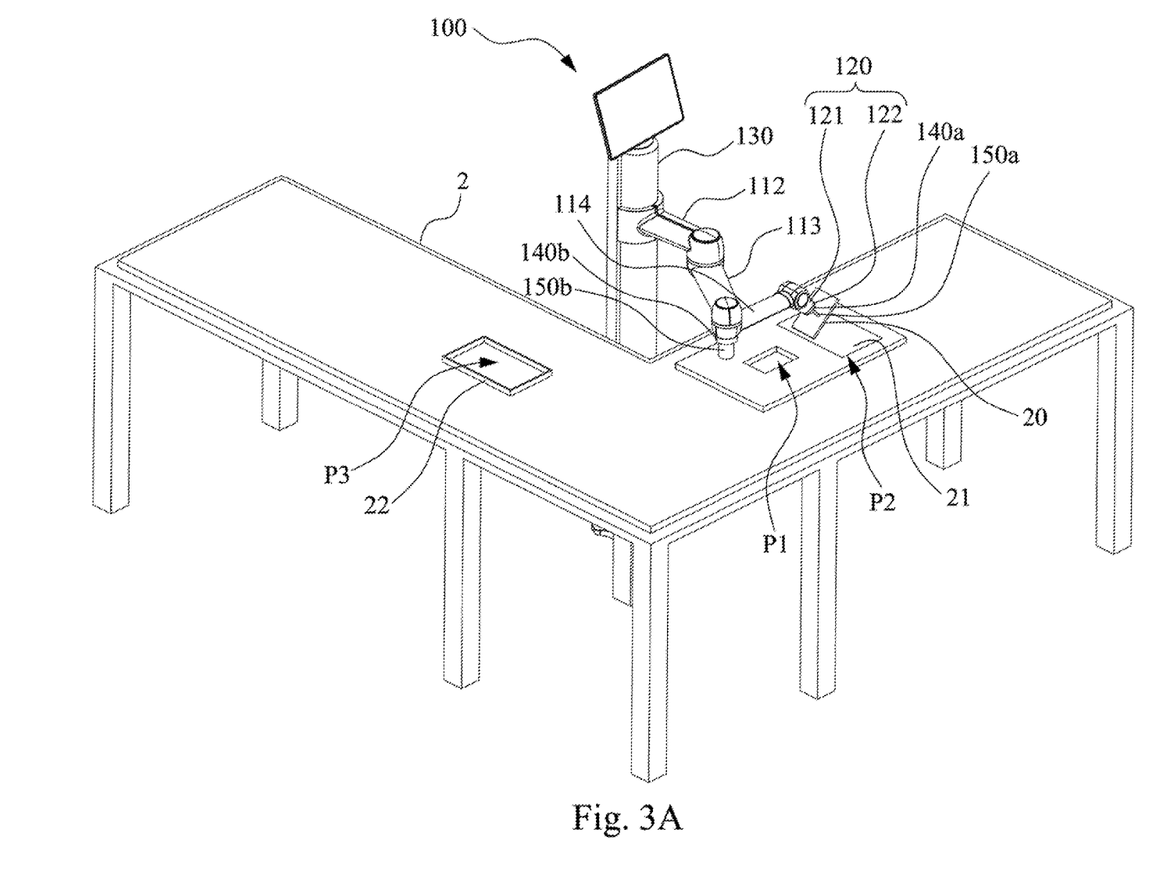
FIG. 3A is a perspective view illustrating an operation stage of a multiaxial robot of multitasking according to an embodiment of the disclosure, in which the multiaxial robot of multitasking picks up a first workpiece on a table.
Figure 3B:
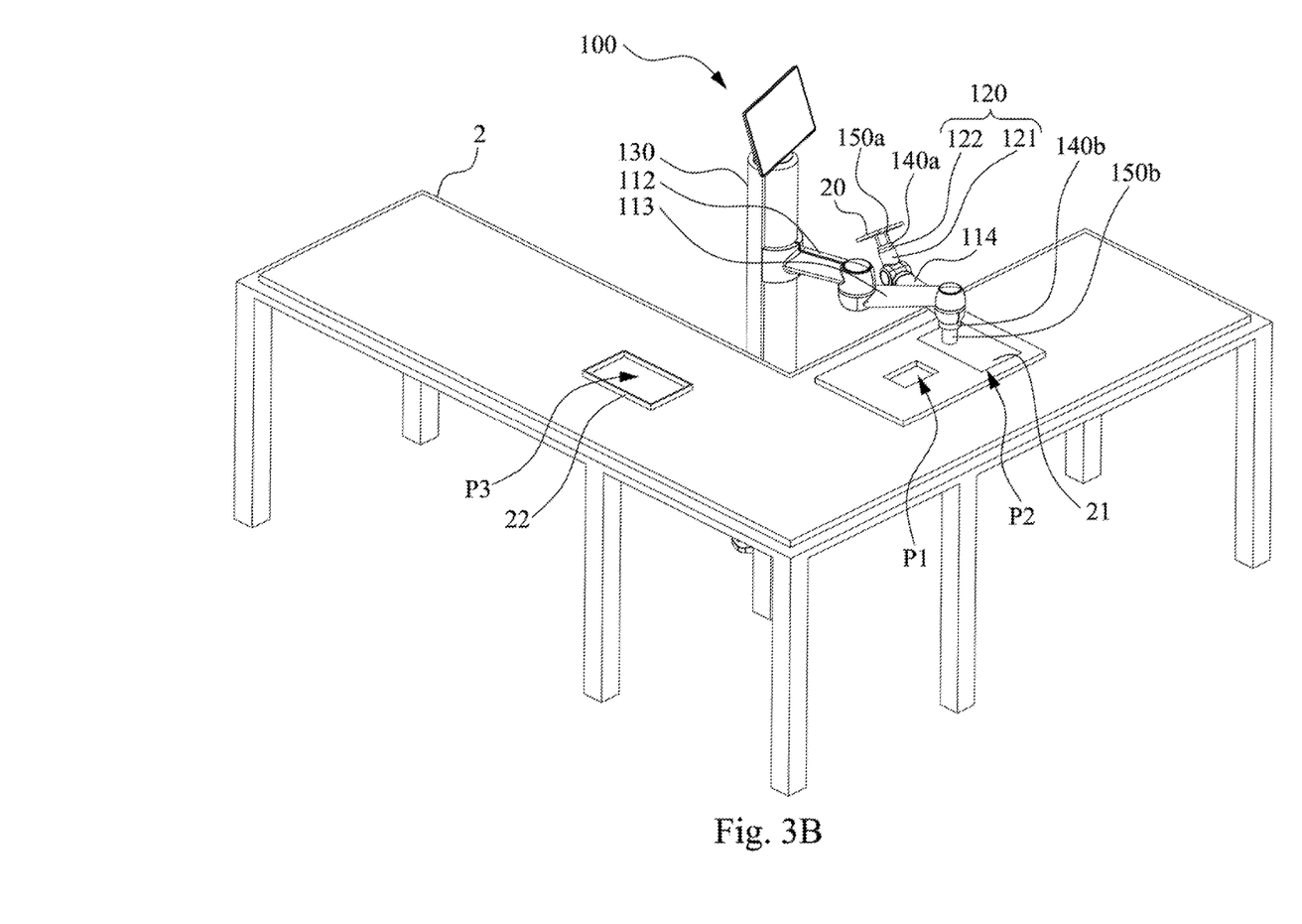
FIG. 3B is a perspective view illustrating the next operation stage of the multiaxial robot of multitasking in FIG. 3A, in which the multiaxial robot of multitasking picks up a second workpiece on the table.
Figure 3C:
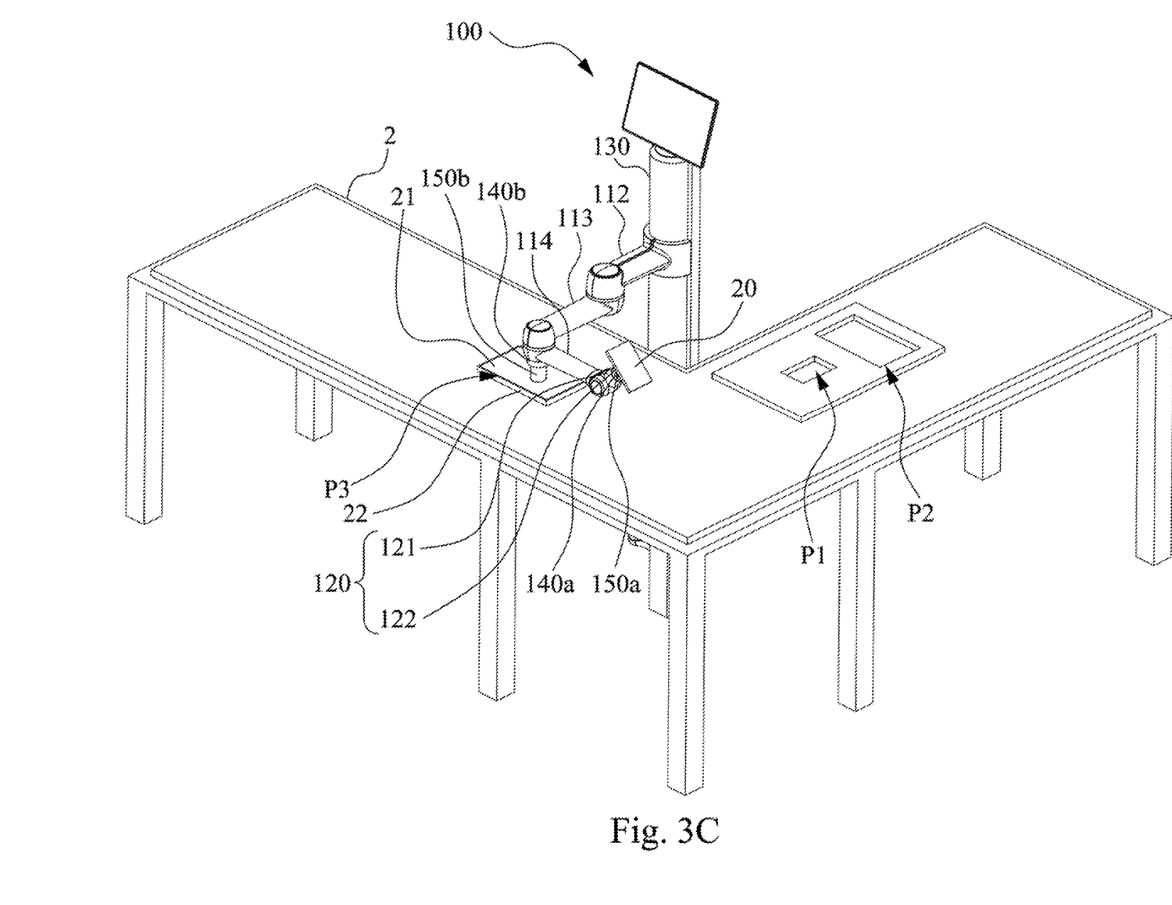
FIG. 3C is a perspective view illustrating the next operation stage of the multiaxial robot of multitasking in FIG. 3B, in which the multiaxial robot of multitasking places the second workpiece on the table.

Reference is made to FIG. 1. FIG. 1 is a perspective view of a multiaxial robot of multitasking 100 according to an embodiment of the disclosure. As shown in FIG. 1, in the embodiment, the multiaxial robot of multitasking 100 includes a base 111, a first arm 112, a second arm 113, a third arm 114, a first wrist 121, a second wrist 122, a first engaging structure 140a, a first tool, a second engaging structure 140b, and a second tool. The first arm 112 the second arm 113, and the third arm 114 are sequentially connected from the base 111, and any adjacent two of the base 111 and the first arm 112, the second arm 113, and the third arm 114 are configured to rotate relative to each other. The first wrist 121 is connected to the farthest arm arranged relative to the base (i.e., the third arm 114) and configured to rotate relative to the connected arm. The second wrist 122 is pivotally connected to the first wrist 121 and configured to rotate relative to the first wrist 121. Relatively speaking, the second wrist 122 is connected to the third arm 114 through the first wrist 121. The first engaging structure 140a is disposed on the second wrist 122. The first tool is connected to the first engaging structure 140a. The second engaging structure 140b is disposed on the third arm 114. The second tool is connected to the second engaging structure 140b. In the embodiment, the first tool is a first grabber 150a, and the second tool is a second grabber 150b. The first grabber 150a is configured to pick up or place a first workpiece 20 (see FIG. 3A), and the second grabber 150b is configured to pick up or place a second workpiece 21 (see FIG. 3B). However, the first tool and the second tool are not limited in this regard and can be replaced by other tools having other functions as needed in practical applications In some embodiments, the first engaging structure 140a and the second engaging structure 140b are flanges, but the disclosure is not limited in this regard.

In some embodiments, the multiaxial robot of multitasking 100 can also omit the first engaging structure 140a and the second engaging structure 140b, and the first tool and the second tool are components directly built in the multiaxial robot of multitasking 100.

Further, in the embodiment, the multiaxial robot of multitasking 100 further includes an elevator member 130. The elevator member 130 is pivotally connected to the base 111 and connected to the first arm 112. The elevator member 130 is configured to elevate components of the multiaxial robot of multitasking 100 arranged after the elevator member 130 (i.e., the first arm 112, the second arm 113, the third arm 114, the first wrist 121, the second wrist 122, the first engaging structure 140a, the first grabber 150a, the second engaging structure 140b, and the second grabber 150b) relative to the base 111 in an elevating direction A (i.e., the direction parallel to z-axis).

Specifically, in the embodiment, an end of the first arm 112 is slidably connected to the elevator member 130. An end of the second arm 113 is pivotally connected to another end of the first arm 112. An end of the third arm 1147 is pivotally connected to another end of the second arm 113. Under the foregoing structural configuration, the multiaxial robot of multitasking 100 of the present embodiment installs the first engaging structure 140a and the second engaging structure 140b at different components (as shown in FIG. 1, the first engaging structure 140a is installed at the second wrist 122, and the second engaging structure 140b is installed at the third arm 114), so the multiaxial robot of multitasking 100 can include two end tools (i.e., the first grabber 150a and the second grabber 150) respectively having different loading capacities, different arm lengths, different precisions, and different degrees of freedom, so as to flexibly allocate tasks. In addition, with the structural configuration of including two independent engaging structures, the multiaxial robot of multitasking 100 of the present embodiment can effectively reduce the weight at the extremity of robotic arm (i.e., only the first grabber 150a is located at the end of the second wrist 122 distal to the first wrist 121) and increase the speed due to the decrease of angular inertia. Furthermore, because the volume at the extremity of the robotic arm is also reduced, movements of the multiaxial robot of multitasking 100 of the disclosure can be more flexible.

As shown in FIG. 1, in the embodiment, the base 111, the first arm 112, the second arm 113, and the third arm 114 constitute a first rotation module 110. The first arm 112, the second arm 113, and the third arm 114 are configured to rotate parallel to a first plane (e.g., the X-Y plane formed by the X-axis and the Y-axis shown in FIG. 1) relative to the base 11. The first wrist 121 and the second wrist 122 constitute a second rotation module 120. The first wrist 121 is configured to rotate parallel to a second plane (e.g., the X-Z plane formed by the X-axis and the Z-axis shown in FIG. 1) relative to the third arm 114. The second wrist 122 is configured to rotate parallel to a third plane (e.g., the Y-Z plane formed by the Y-axis and the Z-axis shown in FIG. 1) relative to the first wrist 121.

With the foregoing structural configuration, the multiaxial robot of multitasking 100 of the embodiment can provide flat and fast operating characteristics by the first arm 112, the second arm 113, and the third arm 114 and perform actions with flexible angles (up to six degrees of freedom) by the first wrist 121 and the second wrist 122, so as to optimize the operation mode of "rapidly and horizontally moving to a location and then performing horizontal or three-dimensional actions". For example, the multiaxial robot of multitasking 100 of the embodiment can easily perform the action of obliquely placing the first workpiece 20 on the horizontal table 2 in FIG. 3D (through the rotation of the first wrist 121 relative to the third arm 114), which is what the conventional SCARA cannot achieve. Moreover, the multiaxial robot of multitasking 100 of the embodiment can complete the whole action (i.e., moving to the destination and then performing the action of obliquely placing the workpiece 20) faster than the conventional six-axis mechanical arm.

In some embodiments, the second plane (i.e., the plane in which the first wrist 121 rotates) is substantially perpendicular to the first plane (i.e., the plane in which the arms of the first rotation module 110 rotate), but the disclosure is not limited in this regard.

In some embodiments, the elevating direction A is substantially perpendicular to the first plane (i.e., the plane in which the arms of the first rotation module 110 rotate), but the disclosure is not limited in this regard.

In the embodiment, the first engaging structure 140*a* is located at an end of the second wrist 122 distal to the first wrist 121, but the disclosure is not limited in this regard. For example, in some embodiments, the multiaxial robot of multitasking 100 can only include the first wrist 121 (i.e., the second wrist 122 is omitted), the first engaging structure 140*a* is modified to be installed at an end of the first wrist 121, and the purpose of picking up or placing the first workpiece 20 by using the first grabber 150*a* can also be achieved. Although the full degrees of freedom of the multiaxial robot of multitasking 100 shown in FIG. 1 cannot be achieved, the action of obliquely placing the workpiece 20 can still be performed. Moreover, the structural configuration reduces one motor, so as to reduce the overall implementation costs.

Figure 5:
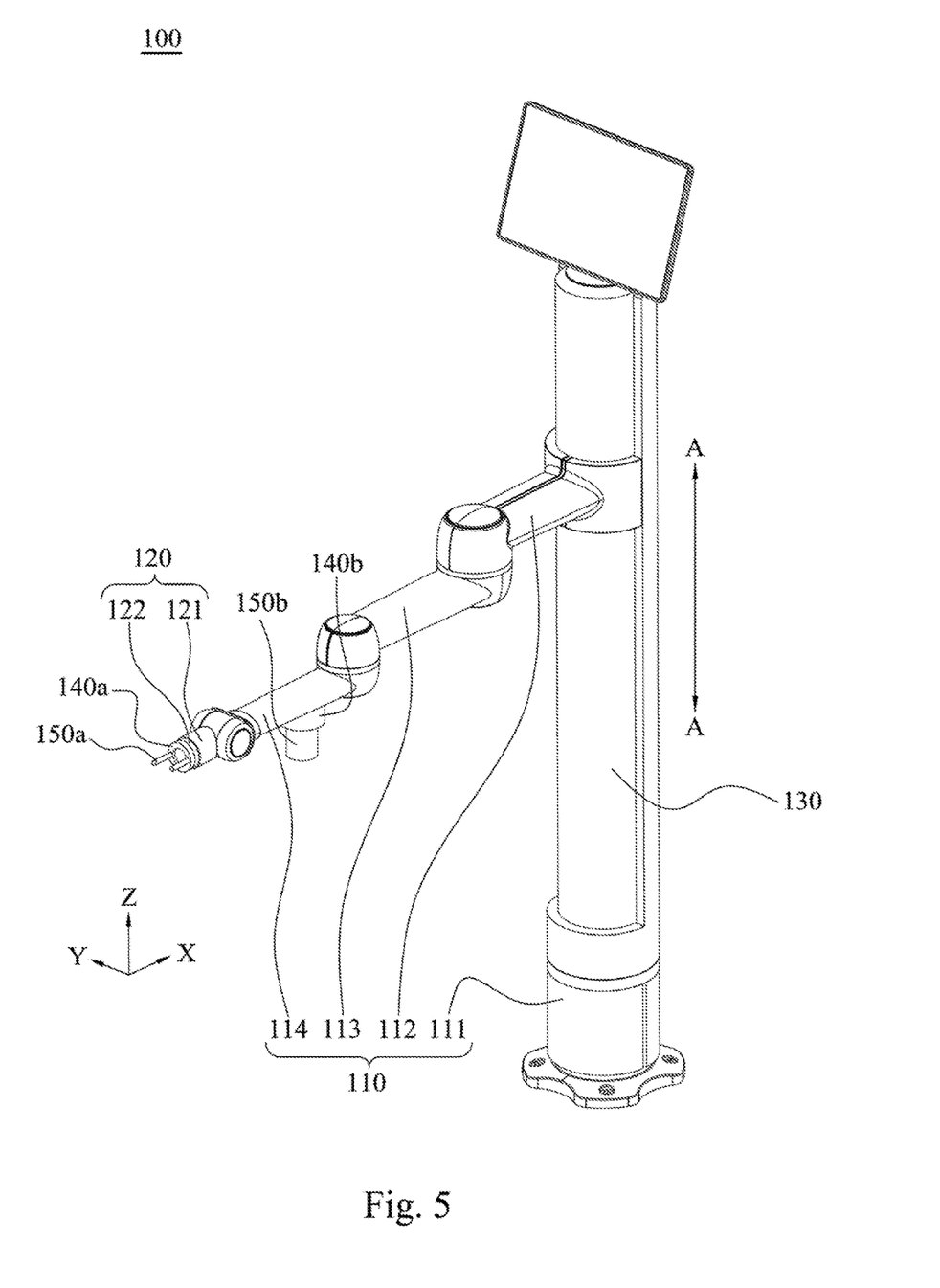
FIG. 5 is a perspective view of a multiaxial robot of multitasking according to another embodiment of the disclosure.

In the embodiment, the second engaging structure 140*b* is disposed on the third arm 114 and adjacent to the end of the third arm 114 pivotally connected to the second arm 113, but the disclosure is not limited in this regard. In practical applications, the second engaging structure 140*b* can be disposed at any location on the first arm 112, the second arm 13, or the third arm 114. For example, reference is made to FIG. 5 in advance. FIG. 5 is a perspective view of a multiaxial robot of multitasking according to another embodiment of the disclosure. As shown in FIG. 5, in the embodiment, the second engaging structure 140*b* is disposed between two ends of the third arm 114. Hence, compared with the embodiment of FIG. 1, the installation position of the second engaging structure 140*b* of the present embodiment has a greater moving range (i.e., greater than the largest moving range covered by the rotation of the end of the third arm 114 pivotally connected to the second arm 113). Therefore, the moving range of the second grabber 150*b* connected to the second engaging structure 140*b* can also be increased correspondingly.

In some embodiments, the number of the arms adopted in the multiaxial robot of multitasking 100 can be larger than three, so as to increase the degrees of freedom to meet the actual demands.

Figure 2:
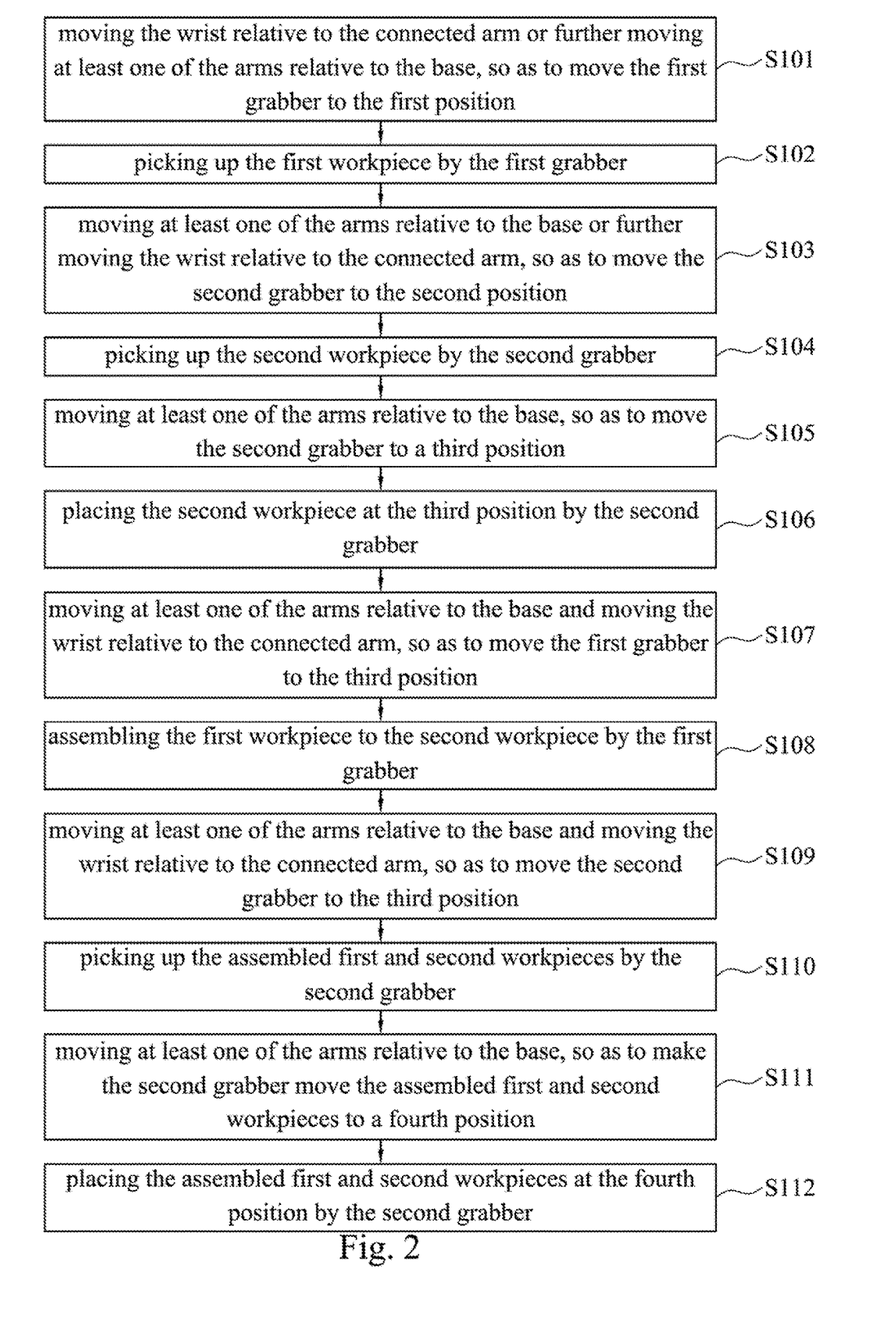
FIG. 2 is a flow chart diagram of an operating method for operating a multiaxial robot of multitasking according to an embodiment of the disclosure.
Figure 3D:
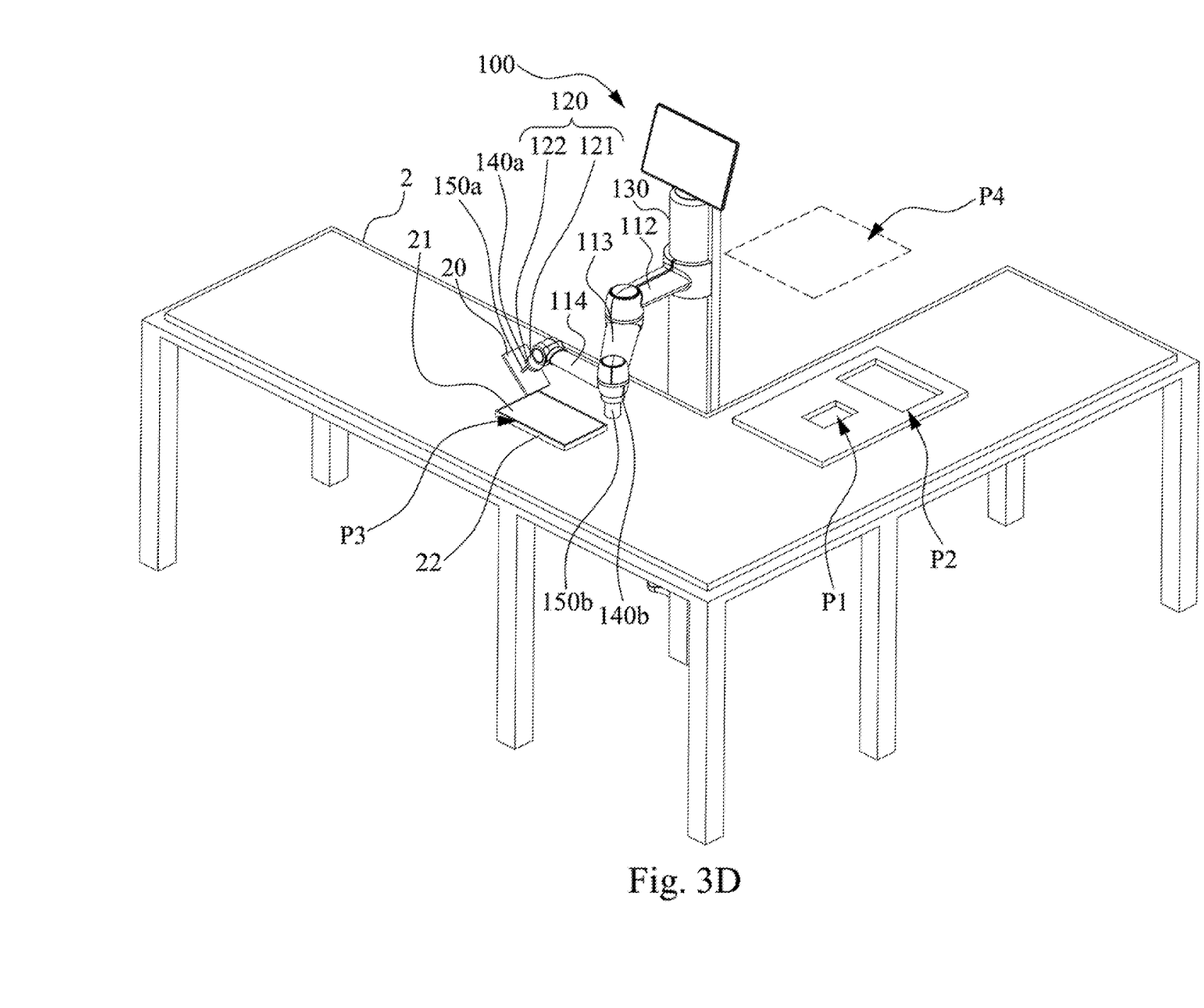
FIG. 3D is a perspective view illustrating the next operation stage of the multiaxial robot of multitasking in FIG. 3C, in which the multiaxial robot of multitasking obliquely places the first workpiece on the second workpiece.

Reference is made to FIGS. 2-3D. FIG. 2 is a flow chart diagram of an operating method for operating a multiaxial robot of multitasking according to an embodiment of the disclosure. FIG. 3A is a perspective view illustrating an operation stage of the multiaxial robot of multitasking 100 according to an embodiment of the disclosure, in which the multiaxial robot of multitasking 100 picks up the first workpiece 20 on the table 2. FIG. 3B is a perspective view illustrating the next operation stage of the multiaxial robot of multitasking 100 in FIG. 3A, in which the multiaxial robot of multitasking 100 picks up the second workpiece 21 on the table 2. FIG. 3C is a perspective view illustrating the next operation stage of the multiaxial robot of multitasking 100 in FIG. 3B, in which the multiaxial robot of multitasking 100 places the second workpiece 21 on the table 2. FIG. 3D is a perspective view illustrating the next operation stage of the multiaxial robot of multitasking 100 in FIG. 3C, in which the multiaxial robot of multitasking 100 obliquely places the first workpiece 20 on the second workpiece 21. Steps S101-S112 included in the operating method in FIG. 2 are introduced below with reference to FIGS. 3A-3D.

It should be pointed out in advance that the operating method in FIG. 2 is used to operate a multiaxial robot of multitasking to assemble a first workpiece located at a first position and a second workpiece located at a second position. The multiaxial robot of multitasking includes a base, a plurality of arms, at least one wrist, a first engaging structure, a first grabber, a second engaging structure, and a second grabber. The arms are sequentially connected away from the base. The wrist is connected to the farthest arm arranged relative to the base. The first engaging structure is disposed on the wrist. The first grabber is connected to the first engaging structure. The second engaging structure is disposed on one of the arms. The second grabber is connected to the second engaging structure. For example, the operating method in FIG. 2 can be used to operate the multiaxial robot of multitasking 100 in FIG. 1 but the disclosure is not limited in this regard.

The operating method begins with step S101 in which the wrist is moved relative to the connected arm or at least one of the arms is further moved relative to the base, so as to move the first grabber to the first position. The operating method continues with step S102 in which the first workpiece is picked up by the first grabber. Take the multiaxial robot of multitasking 100 in FIG. 1 and that in FIG. 3A for example, the first wrist 121 can be moved relative to the third arm 114 or at least one of the first arm 112, the second arm 113, and the third arm 114 can be further moved relative to the base 11, so as to move the first grabber 150*a* to the first position P1 and pick up the first workpiece 20 by the first grabber 150*a*.

The operating method continues with step S103 in which at least one of the arms is moved relative to the base or the wrist is further moved relative to the connected arm, so as to move the second grabber to the second position. The operating method continues with step S104 in which the second workpiece is picked up by the second grabber. Take the multiaxial robot of multitasking 100 in FIG. 1 and that in FIG. 3B for example, at least one of the first arm 112, the second arm 113, and the third arm 114 can be moved relative to the base 111 or the first wrist 121 can be further moved relative to the third arm 114, so as to move the second grabber 150*b* to the second position P2 and pick up the second workpiece 21 by the second grabber 150*b*.

The operating method continues with step S105 in which at least one of the arms is moved relative to the base, so as to move the second grabber to a third position. The operating method continues with step S106 in which the second workpiece is placed at the third position by the second grabber. Take the multiaxial robot of multitasking 100 in FIG. 1 and that in FIG. 3C for example, at least one of the first arm 112, the second arm 113, and the third arm 114 can be moved relative to the base 111, so as to move the second grabber 150*b* to a third position. P3 and place the second workpiece 21 at the third position P3 by the second grabber 150*b*. For example, a fixture 22 is disposed at the third position P3 on the table 2, so the second workpiece 21 can be placed on the fixture 22 by the second grabber 150*b* after the step S106.

The operating method continues with step S107 in which at least one of the arms is moved relative to the base and the wrist is moved relative to the connected arm, so as to move the first grabber to the third position. The operating method continues with step S108 in which the first workpiece is assembled to the second workpiece by the first grabber. Take the multiaxial robot of multitasking 100 in FIG. 1 and that in FIG. 3D for example, at least one of the first arm 112, the second arm 113, and the third arm 114 can be moved relative to the base 111 and the first wrist 121 can be moved relative to the third arm 114, so as to move the first grabber 150*a* to the third position P3 and obliquely assemble the first workpiece 20 to the second workpiece 21 by the first grabber 150*a*.

In some embodiments, the operating method can further include steps S109-S112. The operating method continues with step S109 in which at least one of the arms is moved relative to the base and the wrist is moved relative to the connected arm, so as to move the second grabber to the third position. The operating method continues with step S110 in which the assembled first and second workpieces are picked up by the second grabber. Take the multiaxial robot of multitasking 100 in FIG. 1 and that in FIG. 3D for example, at least one of the first arm 112, the second arm 113, and the third arm 114 can be moved relative to the base 111 and the first wrist 121 can be moved relative to the third arm 114; so as to move the second grabber 150b to the third position P3 and pick up the assembled first and second workpieces 20, 21 by the second grabber 150b.

The operating method continues with step S111 in which at least one of the arms is moved relative to the base; so as to make the second grabber move the assembled first and second workpieces to a fourth position. The operating method continues with step S112 in which the assembled first and second workpieces are placed at the fourth position by the second grabber. Take the multiaxial robot of multitasking 100 in FIG. 1 and that in FIG. 3D for example, at least one of the first arm 112, the second arm 113, and the third arm 114 can be moved relative to the base 111, so as to make the second grabber 150b move the assembled first and second workpieces 20, 21 to a fourth position P4 (e.g., a discharging zone indicated by a dotted circle in FIG. 3D) and place the assembled first and second workpieces 20, 21 at the fourth position P4 by the second grabber 150.

According to the above descriptions about the operating method, can be seen that the multiaxial robot of multitasking of the embodiment installs two engaging structures at different components, so the multiaxial robot of multitasking can include two end tools (i.e., the first grabber and the second grabber) respectively having different loading capacities, different arm lengths, different precisions, and different degrees of freedom, so as to flexibly allocate tasks. With the structural configuration of including two independent engaging structures, the multiaxial robot of multitasking of the embodiment can effectively reduce the weight at the extremity of robotic arm (i.e., only the first grabber 150a is located at the end of the second wrist 122 distal to the first wrist 121) and increase the speed due to the decrease of angular inertia. Furthermore, because the volume at the extremity of the robotic arm is also reduced, movements of the multiaxial robot of multitasking of the disclosure can be more flexible.

Figure 4A:
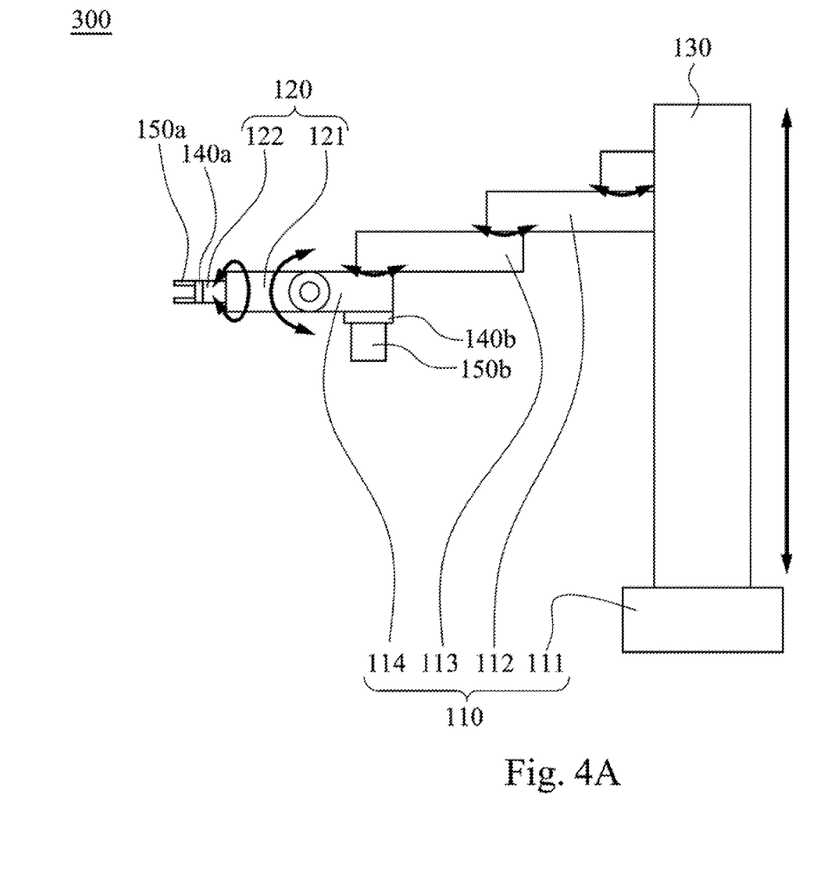
FIG. 4A is a schematic diagram of a multiaxial robot of multitasking according to another embodiment of the disclosure.

Reference is made to FIG. 4A. FIG. 4A is a schematic diagram of a multiaxial robot of multitasking 300 according to another embodiment of the disclosure. As shown in FIG. 4A, in the embodiment, the multiaxial robot of multitasking 300 also includes the first arm 112; the second arm 113, the third arm 114, the first wrist 121, the second wrist 122, the elevator member 130, the first engaging structure 140a, the first grabber 150a, the second engaging structure 140b, and the second grabber 150b. It should be pointed out that the difference between the present embodiment and the embodiment in FIG. 1 is that the present embodiment provides an alternative to the connection order of the arms, the wrists, and the elevator member 130. Specifically, in the multiaxial robot of multitasking 300 of the present embodiment, the elevator member 130 is connected to the base 111. An end of the first arm 112 is slidably and pivotally connected to the elevator member 130. An end of the second arm 113 is pivotally connected to another end of the first arm 112. An end of the third arm 114 is pivotally connected to another end of the second arm 113. The first wrist 121 is pivotally connected to another end of the third arm 114. The second wrist 122 is pivotally connected to the first wrist 121. With the structural configuration, the multiaxial robot 300 of the embodiment can also provide the flat and fast operating characteristics by the first rotation module 110 and perform the actions with flexible angles (up to six degrees of freedom) by the second rotation module 120, so as to optimize the operation mode of "rapidly and horizontally moving to a location and then performing horizontal or three-dimensional actions".

Figure 4B:
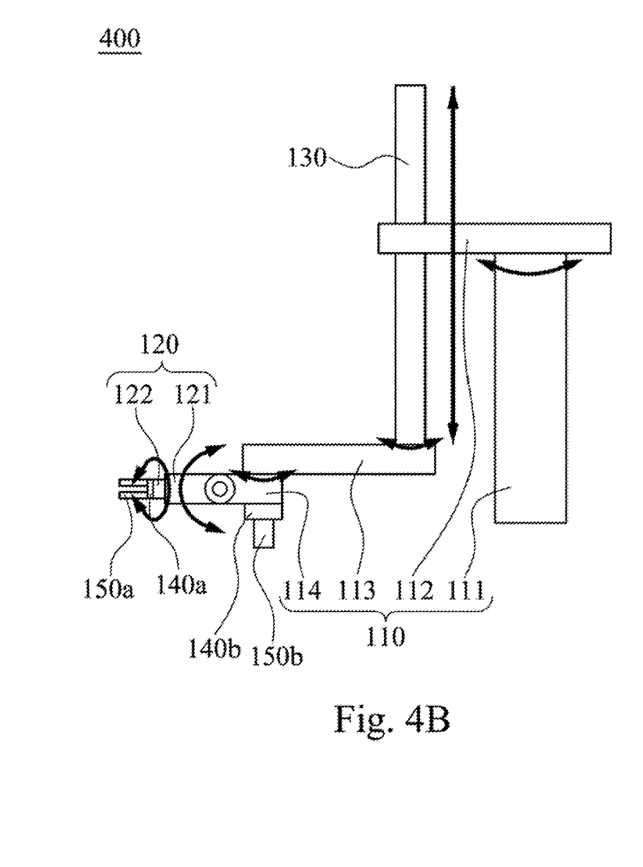
FIG. 4B is a schematic diagram of a multiaxial robot of multitasking according to another embodiment of the disclosure.

Reference is made to FIG. 4B. FIG. 4B is a schematic diagram of a multiaxial robot of multitasking 400 according to another embodiment of the disclosure. As shown in FIG. 46, in the embodiment, the multiaxial robot of multitasking 400 also includes the first arm 112, the second arm 113, the third arm 114, the first wrist 121, the second wrist 122, the elevator member 130, the first engaging structure 140a, the first grabber 150a, the second engaging structure 140b, and the second grabber 150b. It should be pointed out that the difference between the present embodiment and the embodiment in FIG. 1 is that the present embodiment provides an alternative to the connection order of the arms, the wrists, and the elevator member 130. Specifically, in the multiaxial robot of multitasking 400 of the present embodiment, an end of the first arm 112 is pivotally connected to the base 111, and another end of the first arm 112 is slidably connected to the elevator member 130. An end of the second arm 113 is pivotally connected to the elevator member 130. An end of the third arm 114 is pivotally connected to another end of the second arm 113. The first wrist 121 is pivotally connected to another end of the third arm 114. The second wrist 122 is pivotally connected to the first wrist 121. With the structural configuration, the multiaxial robot of multitasking 400 of the embodiment can also provide the flat and fast operating characteristics by the first rotation module 110 and perform the actions with flexible angles (up to six degrees of freedom) by the second rotation module 120, so as to optimize the operation mode of "rapidly and horizontally moving to a location and then performing horizontal or three-dimensional actions".

Figure 4C:
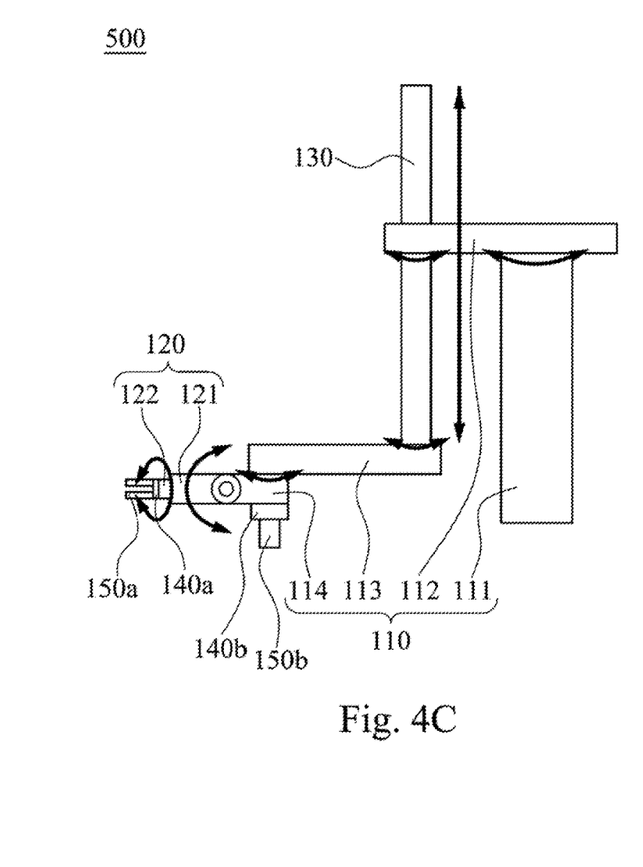
FIG. 4C is a schematic diagram of a multiaxial robot of multitasking according to another embodiment of the disclosure.

Reference is made to FIG. 4C. FIG. 4C is a schematic diagram of a multiaxial robot of multitasking 500 according to another embodiment of the disclosure. As shown in FIG. 4C, in the embodiment, the multiaxial robot of multitasking 500 also includes the first arm 112, the second arm 113, the third arm 114, the first wrist 121, the second wrist 122, the elevator member 130, the first engaging structure 140a, the first grabber 150a, the second engaging structure 140b, and the second grabber 150b. It should be pointed out that the difference between the present embodiment and the embodiment in FIG. 1 is that the present embodiment provides an alternative to the connection order of the arms, the wrists, and the elevator member 130. Specifically, in the multiaxial robot of multitasking 500 of the present embodiment, an end of the first arm 112 is pivotally connected to the base 111, and another end of the first arm 112 is slidably and pivotally connected to the elevator member 130. An end of the second arm 113 is pivotally connected to the elevator member 130. An end of the third arm 114 is pivotally connected to another end of the second arm 113. The first wrist 121 is pivotally connected to another end of the third arm 114. The second wrist 122 is pivotally connected to the first wrist 121. With the structural configuration, the multiaxial robot of multitasking 500 of the embodiment can also provide the flat and fast operating characteristics by the first rotation module 110 and perform the actions with flexible angles (up to six degrees of freedom) by the second rotation module 120, so as to optimize the operation mode of "rapidly and horizontally moving to a location and then performing horizontal or three-dimensional actions".

Figure 4D:
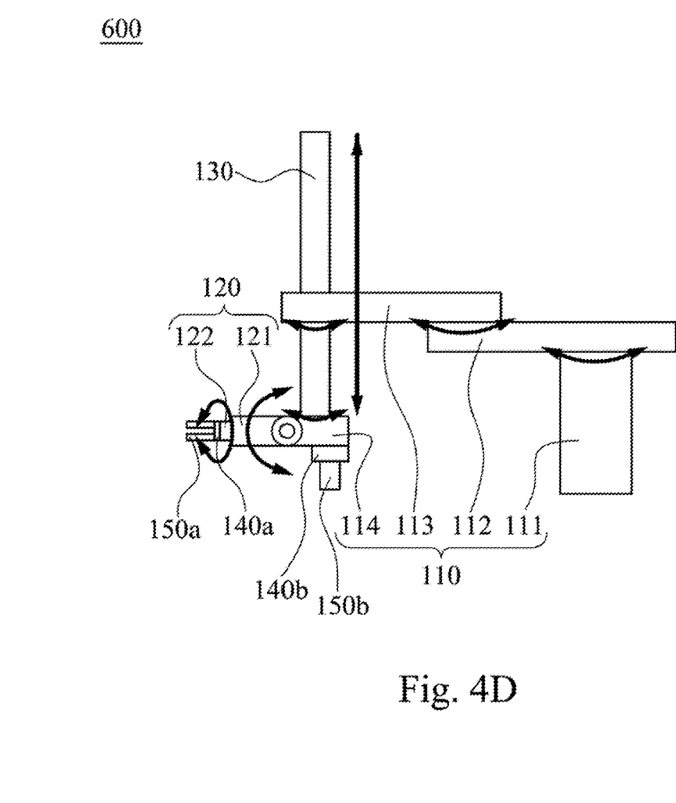
FIG. 4D is a schematic diagram of a multiaxial robot of multitasking according to another embodiment of the disclosure.

Reference is made to FIG. 4D. FIG. 4D is a schematic diagram of a multiaxial robot of multitasking 600 according to another embodiment of the disclosure. As shown in FIG. 4D, in the embodiment, the multiaxial robot of multitasking 600 also includes the first arm 112, the second arm 113, the third arm 114, the first wrist 121, the second wrist 122, the elevator member 130, the first engaging structure 140a, the first grabber 150a, the second engaging structure 140b, and the second grabber 150b. It should be pointed out that the difference between the present embodiment and the embodiment in FIG. 1 is that the present embodiment provides an alternative to the connection order of the arms, the wrists, and the elevator member 130. Specifically, in the multiaxial robot of multitasking 600 of the present embodiment, an end of the first arm 112 is pivotally connected to the base 111. An end of the second arm 113 is pivotally connected to another end of the first arm 112, and another end of the second arm 113 is slidably connected to the elevator member 130. An end of the third arm 114 is pivotally connected to the elevator member 130. The first wrist 121 is pivotally connected to another end of the third arm 114. The second wrist 122 is pivotally connected to the first wrist 121. With the structural configuration, the multiaxial robot of multitasking 600 of the embodiment can also provide the flat and fast operating characteristics by the first rotation module 110 and perform the actions with flexible angles (up to six degrees of freedom) by the second rotation module 120, so as to optimize the operation mode of "rapidly and horizontally moving to a location and then performing horizontal or three-dimensional actions".

Figure 4E:
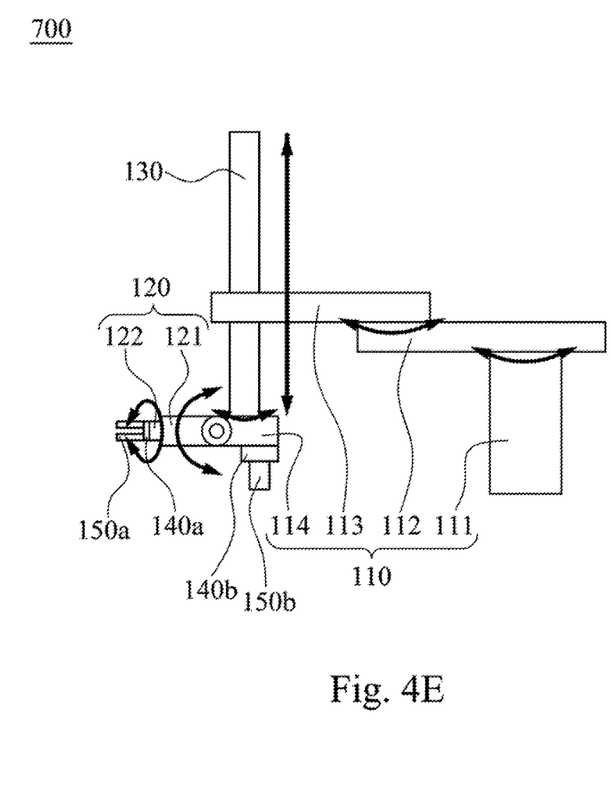
FIG. 4E is a schematic diagram of a multiaxial robot of multitasking according to another embodiment of the disclosure.

Reference is made to FIG. 4E. FIG. 4E is a schematic diagram of a multiaxial robot of multitasking 700 according to another embodiment of the disclosure. As shown in FIG. 4E, in the embodiment, the multiaxial robot of multitasking 700 also includes the first arm 112, the second arm 113, the third arm 114, the first wrist 121, the second wrist 122, the elevator member 130, the first engaging structure 140a, the first grabber 150a, the second engaging structure 140b, and the second grabber 150b. It should be pointed out that the difference between the present embodiment and the embodiment in FIG. 1 is that the present embodiment provides an alternative to the connection order of the arms, the wrists, and the elevator member 130. Specifically, in the multiaxial robot of multitasking 700 of the present embodiment, an end of the first arm 112 is pivotally connected to the base 111. An end of the second arm 113 is pivotally connected to another end of the first arm 112, and another end of the second arm 113 is slidably and pivotally connected to the elevator member 130. An end of the third arm 114 is connected to the elevator member 130. The first wrist 121 is pivotally connected to another end of the third arm 114. The second wrist 122 is pivotally connected to the first wrist 121. With the structural configuration, the multiaxial robot of multitasking 700 of the embodiment can also provide the flat and fast operating characteristics by the first rotation module 110 and perform the actions with flexible angles (up to six degrees of freedom) by the second rotation module 120, so as to optimize the operation mode of "rapidly and horizontally moving to a location and then performing horizontal or three-dimensional actions".

Figure 4F:
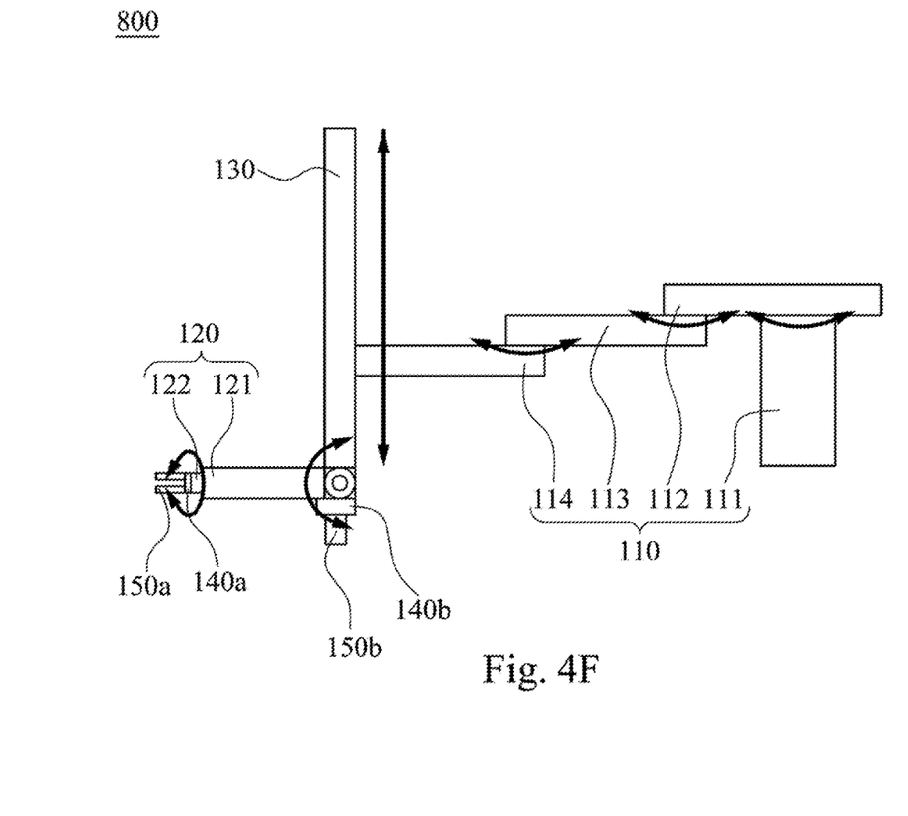
FIG. 4F is a schematic diagram of a multiaxial robot of multitasking according to another embodiment of the disclosure.

Reference is made to FIG. 4F. FIG. 4F is a schematic diagram of a multiaxial robot of multitasking 800 according to another embodiment of the disclosure. As shown in FIG. 4F, in the embodiment, the multiaxial robot of multitasking 800 also includes the first arm 112, the second arm 113, the third arm 114, the first wrist 121, the second wrist 122, the elevator member 130, the first engaging structure 140a, the first grabber 150a, the second engaging structure 140a, and the second grabber 150b. It should be pointed out that the difference between the present embodiment and the embodiment in FIG. 1 is that the present embodiment provides an alternative to the connection order of the arms, the wrists, and the elevator member 130. Specifically, in the multiaxial robot of multitasking 800 of the present embodiment, an end of the first arm 112 is pivotally connected to the base 111. An end of the second arm 113 is pivotally connected to another end of the first arm 112. An end of the third arm 114 is connected to another end of the second arm 113, and another end of the third arm 114 is slidably connected to the elevator member 130. The first wrist 121 is pivotally connected to the elevator member 130. The second wrist 122 is pivotally connected to the first wrist 121. With the structural configuration, the multiaxial robot of multitasking 800 of the embodiment can also provide the flat and fast operating characteristics by the first rotation module 110 and perform the actions with flexible angles (up to six degrees of freedom) by the second rotation module 120, so as to optimize the operation mode of "rapidly and horizontally moving to a location and then performing horizontal or three-dimensional actions". In addition, another difference between the present embodiment and the embodiment in FIG. 1 is that the second engaging structure 140b of the present embodiment is disposed on the first wrist 121, but the multiaxial robot of multitasking 800 of the present embodiment can also include two end tools respectively having different loading capacities, different arm lengths, different precisions, and different degrees of freedom, so as to flexibly allocate tasks.

According to the foregoing recitations of the embodiments of the disclosure, it can be seen that the multiaxial robot of multitasking of the disclosure installs two engaging structures at different components (e.g., one engaging structure is installed at an arm, and another engaging structure is installed at a wrist), so the multiaxial robot of multitasking can include two end tools respectively having different loading capacities, different arm lengths, different precisions, and different degrees of freedom, so as to flexibly allocate tasks. With the structural configuration of including two independent engaging structures, the multiaxial robot of multitasking of the disclosure can effectively reduce the weight at the extremity of robotic arm and increase the speed due to the decrease of angular inertia. Furthermore, because the volume at the extremity of the robotic arm is also reduced, movements of the multiaxial robot of multitasking of the disclosure can be more flexible.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A multiaxial robot of multitasking, comprising:
a base;

a plurality of arms sequentially connected from the base, any adjacent two of the base and the arms being configured to rotate relative to each other;

at least one wrist connected to the farthest arm arranged relative to the base and configured to rotate relative to the farthest arm;

a first engaging structure disposed on the wrist and configured to connect a first tool; and a second engaging structure disposed on one of the arms and configured to connect a second tool.

2. The multiaxial robot of multitasking of claim 1, wherein the second engaging structure is disposed on the farthest arm arranged relative to the base.

3. The multiaxial robot of multitasking of claim 1, wherein the arms are configured to rotate parallel to a first plane relative to the base, and the wrist is configured to rotate parallel to a second plane relative to the farthest arm.

4. The multiaxial robot of multitasking of claim 1, further comprising an elevator member pivotally connected to the base and connected to an adjacent one of the arms, wherein the elevator member is configured to elevate components of the multiaxial robot of multitasking arranged after the elevator member relative to the base in an elevating direction.

5. The multiaxial robot of multitasking of claim 4, wherein the arms comprises:
a first arm, an end of the first arm being slidably connected to the elevator member;
a second arm, an end of the second arm being pivotally connected to another end of the first arm; and
a third arm, an end of the third arm being pivotally connected to another end of the second arm, wherein the wrist is pivotally connected to another end of the third arm.

6. The multiaxial robot of multitasking of claim 5, wherein the second engaging structure is disposed on the third arm and adjacent to the end of the third arm pivotally connected to the second arm.

7. The multiaxial robot of multitasking of claim 1, further comprising an elevator member connected to adjacent two of the arms and the wrist, wherein the elevator member is configured to elevate components of the multiaxial robot of multitasking arranged after the elevator member relative to the base in an elevating direction.

8. The multiaxial robot of multitasking of claim 7, wherein the arms comprises:
a first arm, an end of the first arm being pivotally connected to the base, another end of the first arm being slidably connected to the elevator member;
a second arm, an end of the second arm being pivotally connected to the elevator member; and
a third arm, an end of the third arm being pivotally connected to another end of the second arm, wherein the wrist is pivotally connected to another end of the third arm.

9. The multiaxial robot of multitasking of claim 7, wherein the arms comprises:
a first arm, an end of the first arm being pivotally connected to the base, another end of the first arm being slidably and pivotally connected to the elevator member;
a second arm, an end of the second arm being pivotally connected to the elevator member; and
a third arm, an end of the third arm being pivotally connected to another end of the second arm, wherein the wrist is pivotally connected to another end of the third arm.

10. The multiaxial robot of multitasking of claim 7, wherein the arms comprises:
a first arm, an end of the first arm being pivotally connected to the base;
a second arm, an end of the second arm being pivotally connected to another end of the first arm, another end of the second arm being slidably connected to the elevator member; and
a third arm, an end of the third arm being pivotally connected to the elevator member, wherein the wrist is pivotally connected to another end of the third arm.

11. The multiaxial robot of multitasking of claim 7, wherein the arms comprises:
a first arm, an end of the first arm being pivotally connected to the base;
a second arm, an end of the second arm being pivotally connected to another end of the first arm, another end of the second arm being slidably and pivotally connected to the elevator member; and
a third arm, an end of the third arm being connected to the elevator member, wherein the wrist is pivotally connected to another end of the third arm.

12. The multiaxial robot of multitasking of claim 7, wherein the arms comprises:
a first arm, an end of the first arm being pivotally connected to the base;
a second arm, an end of the second arm being pivotally connected to another end of the first arm; and
a third arm, an end of the third arm being pivotally connected to another end of the second arm, another end of the third arm being slidably connected to the elevator member, wherein the wrist is pivotally connected to the elevator member.

13. The multiaxial robot of multitasking of claim 7, wherein the second engaging structure is disposed on the farthest arm arranged relative to the base.

14. The multiaxial robot of multitasking of claim 1, further comprising:
a first wrist connected to the farthest arm arranged from the base and configured to rotate parallel to the second plane relative to the farthest arm; and
a second wrist pivotally connected to the first wrist and configured to rotate parallel to a third plane relative to the first wrist.

15. The multiaxial robot of multitasking of claim 14, wherein the first engaging structure is disposed on the second wrist and located at an end of the second wrist distal to the first wrist.

* * * * *